(12) United States Patent
Holmberg (10) Patent No.: US 6,631,191 B1
(45) Date of Patent: Oct. 7, 2003

(54) SOUND DIRECTING DEVICE

(75) Inventor: Per Holmberg, Dalby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/501,268

(22) Filed: Feb. 9, 2000

(30) Foreign Application Priority Data

Feb. 18, 1999 (SE) .......................................... 9900609-0

(51) Int. Cl.[7] .............................................. H04M 1/00
(52) U.S. Cl. ................................................ 379/433.02
(58) Field of Search ....................... 379/433.01, 433.02; 455/90, 575

(56) References Cited

U.S. PATENT DOCUMENTS 5,729,605 A * 3/1998 Bobisuthi et al. ...... 379/433.02

* cited by examiner

*Primary Examiner*—Jack Chiang
(74) *Attorney, Agent, or Firm*—Nixon & Vanderhye P.C.

(57) ABSTRACT

In an electronic apparatus comprising a housing and loud speaker (6,19,27,29,47) mounted in the housing, a sound directing element (3,14,30,38,49,56) is provided for movement between a first position in which the element covers at least part of the loud speaker sound generated by the loud speaker (6,19,27,29,47) being toned in one direction and redirected in another direction, and a second position in which said at least part of the loud speaker is uncovered.

21 Claims, 5 Drawing Sheets

SOUND DIRECTING DEVICE

FIELD OF THE INVENTION

The present invention relates to an electronic apparatus comprising a housing and loud speaker mounted in the housing, and more particularly to an electronic apparatus having a sound directing device.

DESCRIPTION OF THE PRIOR ART

A user of a mobile telephone listening by placing the loud speaker or earpiece close to his ear. Therefore, the sound from the loud speaker should be sufficiently low in order to not cause impaired hearing of the user. Some mobile phones are provided with a PMR (private mobile radio) function, which when it is activated generates a high sound level in the loud speaker, for example during a call, so that the user can hear a call in the phone from a remote distance. In this particular mode it is not allowable to put the loud speaker close to the user's ear because the sound is too loud.

There are several prior art devices solving the problem of changing the level of the sound generated by the loud speaker in order to prevent impaired hearing of the user. One known solution provides two loud speakers, one for the mobile phone, which generates a low sound level, and another for the PMR function, which generates a higher sound level. This solution is expensive and complicated, because two loud speakers have to be mounted in the electronic device. Additionally it is required that the user has activated the correct loud speaker when using the mobile phone. However, the user may use the wrong loud speaker when he intends to use the mobile phone, while a call is just received at the moment with the PMR function activated. Hence, the high sound level is transmitted straight into the user's ear, probably causing impaired hearing.

Another technology using only one loud speaker is available, which intends to solve the above mentioned problem. This device comprises a switch controlled by the user, wherein the switch activates either the mobile phone or the PMR function. The sound level is controlled at the same time. However, there is also a problem associated with this solution. The user may forget to switch the mode of the phone from the PMR mode to operate in a mobile phone mode when he intends to use the phone as a conventional mobile phone. Consequently, the PMR function is activated and generates the higher sound level in the loud speaker. When, a call is received the higher sound level will cause impaired hearing of the user.

EP-B1-0 087 908 discloses an electroacoustic calling device the volume of whose output may be controlled without alteration of the electrical signals supplied thereto. The housing of the device has a planar member including at least one aperture through which soundwaves may pass substantially unimpeded. Further, the housing has a second planar member which is movable with respect to the first planar member and which includes at least one aperture. The second planar member is positioned so that movement of the planar members with respect to each other causes a variation in the unimpeded path of soundwaves so as to provide variable attenuation of the sound. This device does not provide is not suitable in PMR mode.

EP-A-2 224 449 discloses a telephone terminal equipment having a rotary aperture adjustment cover to allow setting of the sound volume.

Another sound adjusting device is disclosed by JP-A-9 055 971. The device comprises a sound volume changing plate between a speaker and a sound hole provided on the side of a housing controlled from the outside of the housing.

None of these devices solve the problem of avoiding the high sound level generated by the loud speaker, when the PMR function is activated, from being transmitted directly into the ear of the user.

SUMMARY OF THE INVENTION

Therefore, it is an object of the present invention to provide an electronic apparatus comprising a loud speaker which overcomes the above mentioned problem.

This is accomplished by a sound directing device or element according to the invention mounted on an electronic apparatus comprising a housing and a loud speaker mounted in the housing. The sound directing element is mounted for movement between a first position in which the element covers at least part of the loud speaker sound generated by the loud speaker being toned in one direction and redirected in another direction, and a second position in which said at least part of the loud speaker is uncovered.

Another object of the invention is to provide a sound directing element mounted in an electronic apparatus having a switch for adjusting the sound from the loud speaker between a high and a low level.

Another object of the invention is to provide a combined push to talk and mute function button mounted in an electronic apparatus, wherein the microphone is turned off at the same time as the user are listening to an incoming loudspeaking sound.

Still another object of the invention is to provide a sound directing element having means indicating the position of the sound direction element.

An advantage of the present invention is its simplicity, cheapness, user friendliness and safety. Furhter, the sound directing device is capable of redirecting the sound from the regular loud speaker aperture and consequently eliminates the risk of impaired hearing. Hence, a high call signal can never pass directly into the ear of the user in the direction from the regular loud speaker aperture of the electronic apparatus. Additionally, the sound directing device visually shows when the electronic device is in a PMR mode or in a mobile telephone mode.

BRIEF DESCRIPTION OF THE DRAWINGS

In order to explain the invention in more detail and the advantages and features of the invention a preferred embodiment will be described in detail below, reference being made to the accompanying drawings, in which.

DETAILED DESCRIPTION OF THE INVENTION

Figure 1:
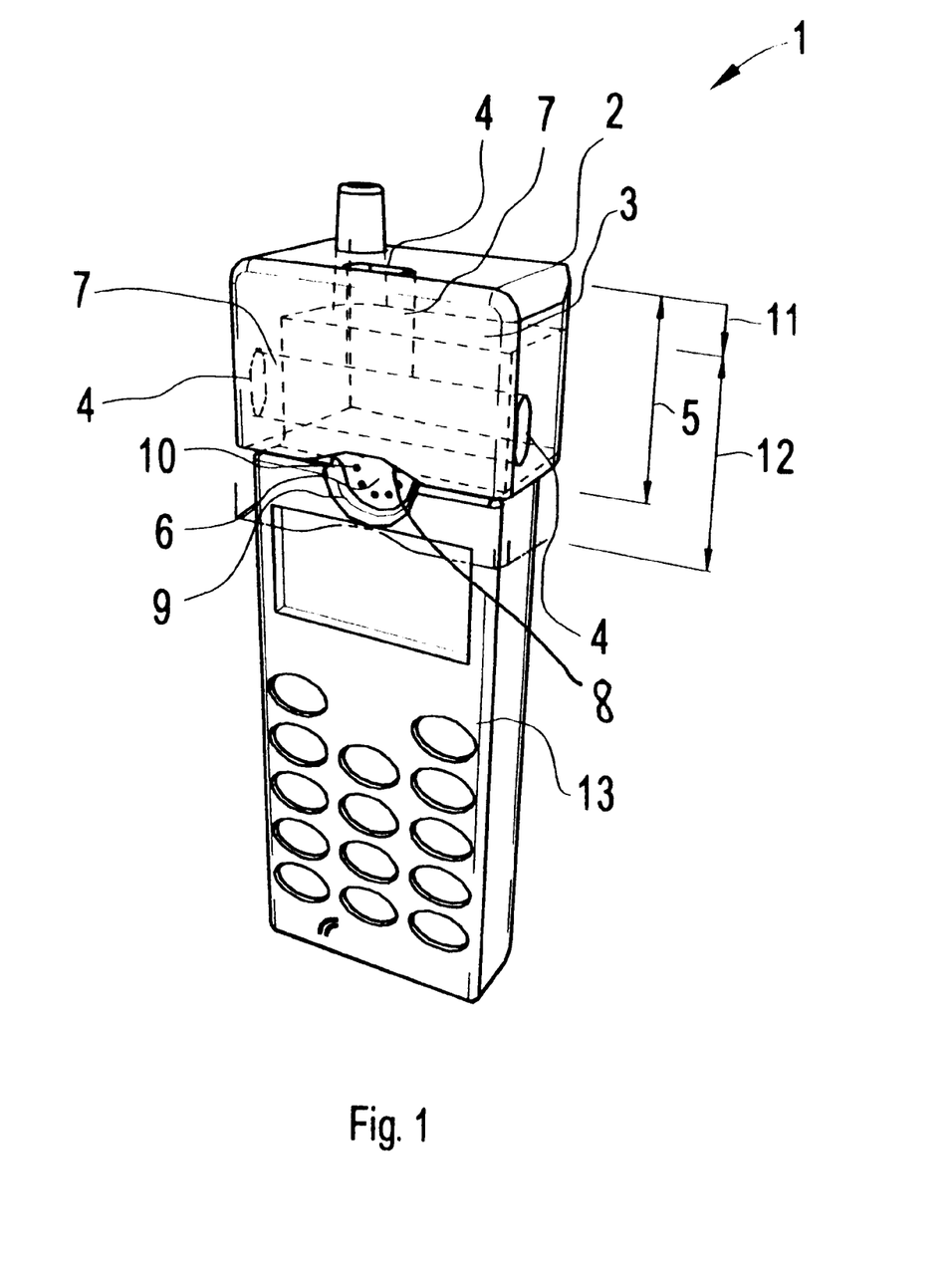
FIG. 1 is an illustrative view of an electronic apparatus having a first embodiment of a sound directing element according to the present invention.

An electronic apparatus 1, comprising a housing 13 and a loud speaker 6 mounted in the housing is shown in FIG. 1. It has a first embodiment of a sound directing element 3 for movement between a first position 5 in which the element does not cover at least part of the loud speaker 6. In this first position 5 sound generated by the loud speaker 6 is toned in one direction and redirected in another direction, and in a second position 12 the at least part of the loud speaker is covered.

In the first position 5 the loud speaker 6 is uncovered by means of a recess 8 or overlaps at least an aperture 10 in a covering part 9 in the housing 2. The housing 2 comprises at least a sound directing part 3, having at least a sound channel 7 and at least an aperture 4. The channel 7 can also be arranged completely or partly in a housing 13 of the electronic apparatus 1 in the corresponding position as the housing 2 and/or in the housing 2. When this housing 2 is slided in the direction 11 it is moved to a position 12, wherein at least part of the loud speaker 6 is covered as much as the sound generated by the loud speaker is redirected to at least one of the channels 7 and is transmitted out from at least one of the apertures 4.

Figure 2:
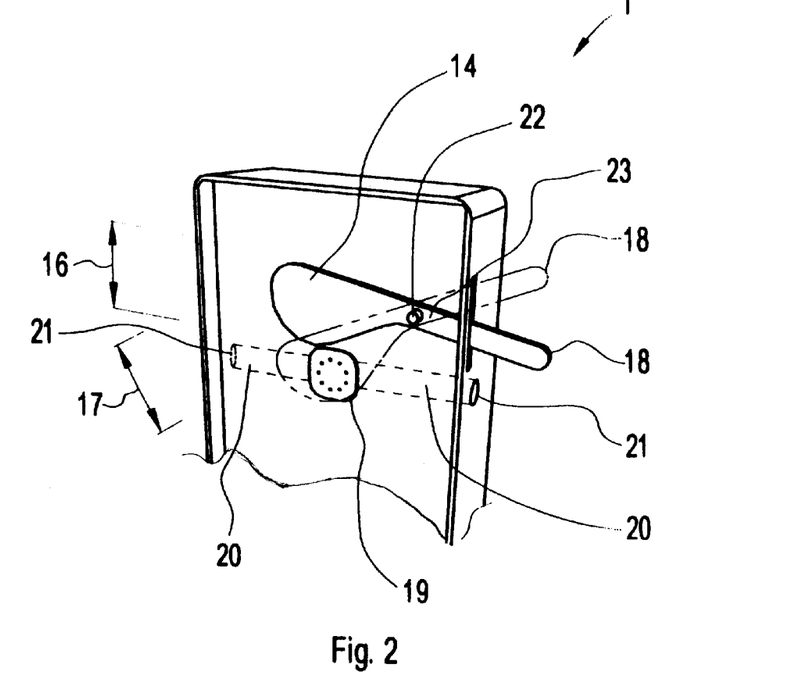
FIG. 2, is an illustrative view of a part of an electronic apparatus having a second embodiment of a sound directing element according to the present invention.

In a second embodiment of the invention shown in FIG. 2, the sound directing element comprises a pivoted member 14 arranged on at least an axis 22 attached on the housing. The member 14 can be rotated between at least two positions 16, 17 by operating means 18. In the position 17 or when the PMR mode is set a loud speaker 19 is mainly covered, so that a sound is attenuated in that direction instead of being transmitted directly through the opening of the loud speaker 19 and is forced out via at least one sound channel 20 and further out from an aperture 21 in the housing. In the position 16 or the mobile telephone mode, the sound is transmitted in straight direction from the loud speaker.

Figure 3:
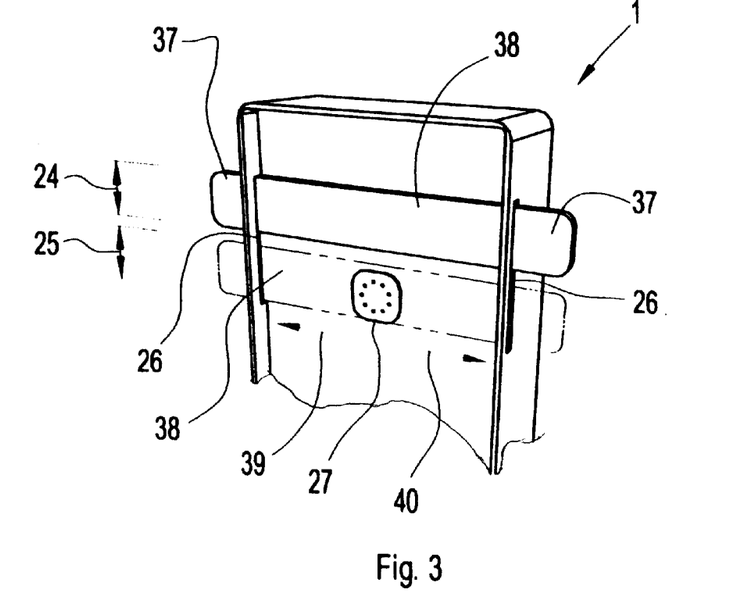
FIG. 3 is an illustrative view of a part of an electronic apparatus having a third embodiment of a sound directing element according to the present invention.

As shown in FIG. 3 the electronic apparatus 1 is provided with third embodiment of a sound directing device according to the invention, comprising a slidable member 38. It is slidable between two positions 24, 25. This is performed by moving the slidable member 38 from at least one side of the electronic apparatus by means of control means 47 along at least a line 26 in on optional direction. In the position 25 at least a part of a loudspeaker 25 is covered and thereby the sound is redirected in another direction through channels as described in FIG. 2. In an alternative embodiment of the invention the sound directing device 38 may be moved from the position 25 in at least another direction 39, 40, causing a sound directing device 38 to cover and uncover the loud speaker 27, respectively. Further, the slidable member 38 is guided in slots in the housing.

Figure 4:
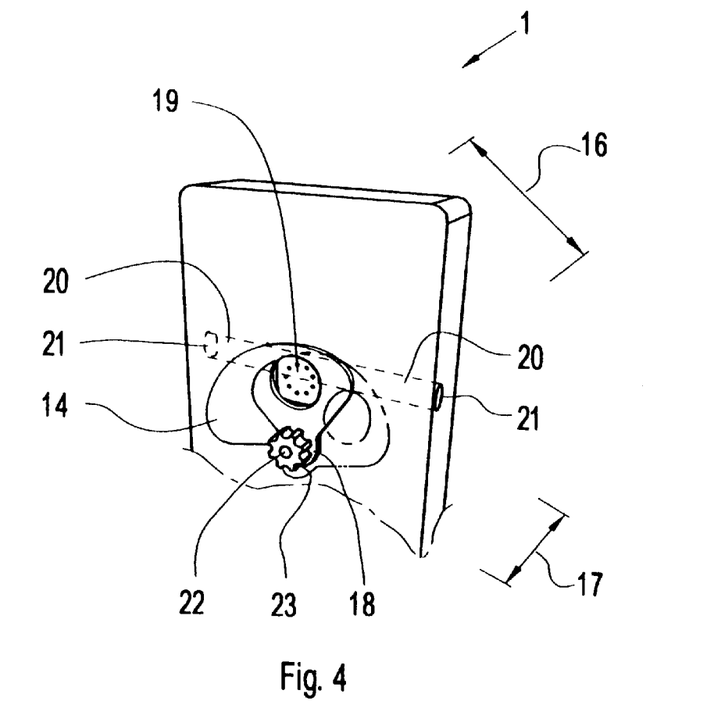
FIG. 4 is an illustrative view of a part of an electronic apparatus having a fourth embodiment of a sound directing element according to the present invention.

In a fourth embodiment of the invention shown in FIG. 4, the sound directing element comprises a pivoted member 14 arranged on at least an axis 22 attached on the housing. The member 14 can be rotated between at least two positions 16, 17 by operating means 23. In the position 17 or when the PMR mode is set a loud speaker 19 is mainly covered. so that a sound is attenuated in that direction instead of being transmitted directly through the opening of the loud speaker 19 and is forced out via at least one sound channel 20 and further out from an aperture 21 in the housing. In the position 16 or the mobile telephone mode, the sound is transmitted in straight direction from the loud speaker via an aperture.

Figure 5:
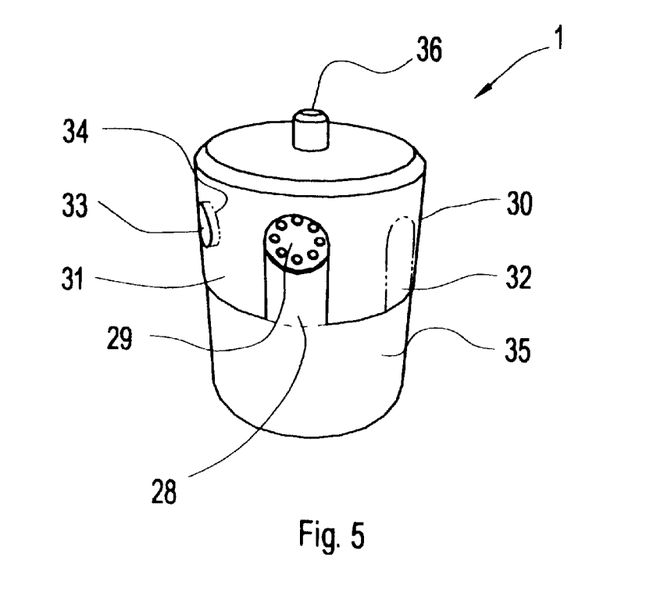
FIG. 5, is an illustrative view of a part of an electronic apparatus having a fifth embodiment of a sound directing element according to the present invention.

With reference to FIG. 5 the electronic apparatus 1 is provided with a fifth embodiment of a sound directing element according to the invention, comprising a rotary housing (30). The rotary housing 30 is set in the mobile telephone mode, wherein the loud speaker 29 is uncovered, because an aperture 28 in the housing 30 is in front of the loud speaker 29. If the sound directing device 30 is arranged on the outside of the electronic apparatus 1 it can be rotated directly without operating a rotary activation means 36, so that the loud speaker 29 is covered by at least a part of the surface 31 of the housing 30. For example, the aperture 28 is in position 32. Then, the sound will be reduced in direction directly from the loud speaker 29, but it will be transmitted away through another aperture 33 in the sound directing device 30. A channel or aperture 34 and the aperture 33 in the sound directing device 30 is overlapping in this position. In an alternative embodiment the sound directing element is provided within a housing 35 of the electronic apparatus 1. In such embodiment the rotary housing 30 is operated between its positions by means of the rotary activation means 36. In the same way as described with reference to the embodiment in FIG. 1 channels is arranged either in the housing 35 of the electronic apparatus 1 or in the sound directing element 30 itself.

Figure 6:
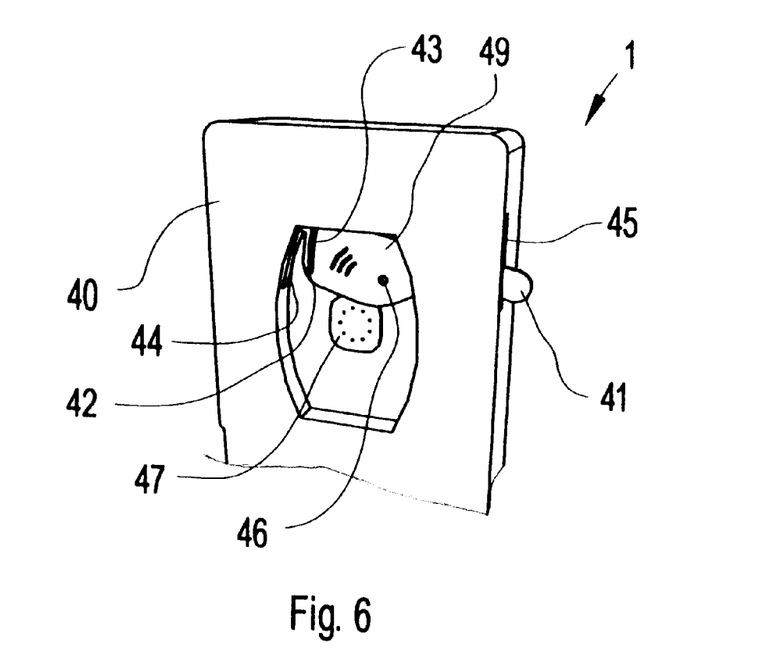
FIG. 6 is an illustrative view of a part of an electronic apparatus having a sixth embodiment of a sound directing element according to the present invention.
Figure 7:
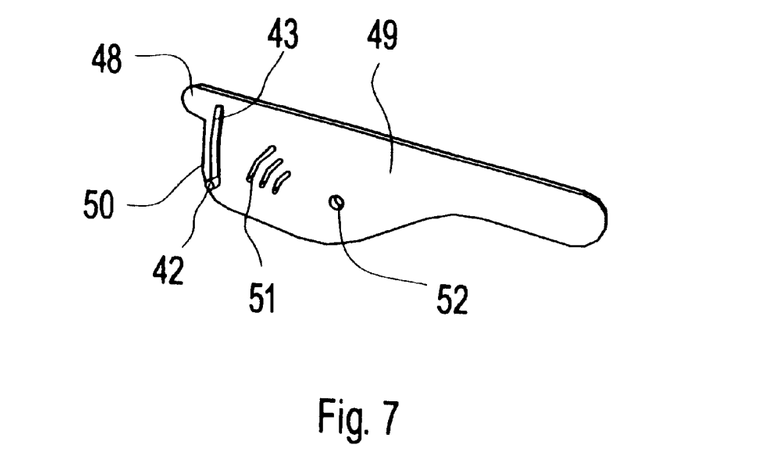
FIG. 7 is an illustrative view of the sound directing element in FIG. 6 in further detail.

With reference to FIGS. 6 and 7, an electronic apparatus having a sixth embodiment of a sound directing element according to the present invention is shown.

The sound directing element comprises a pivoted member 49 attached to the electronic apparatus 1. A sound directing element and the electronic apparatus 1 is assembled while the cover of the mobile phone is open. The pivoted member 49 is mounted on an axis 46 via an aperture 52. An operating means 41, which is an end portion of the member 49, extends out from an opening slot 45 in the housing of the electronic apparatus.

The axis 46 is an extension from either the electronic apparatus 1 or the member 49 and consequently no additional loose parts are necessary for its attachment to the electronic apparatus. Further, no additional parts are needed to keep the sound directing element in its position, because it is guided not only in the slot 45 but also in its other end portion 48, which is guided in another slot 44 in the housing of the electronic apparatus 1.

In this embodiment of the invention the axis 46 is excentrically arranged, so that a small movement of the operating means 41 causes a large movement of the portion of the pivoted member 49 which in a first position covers the loud speaker output 47. In this way a gearing of the movement is achieved, so that covering of the loudspeaker 47 occurs quickly and distinctly. Additionally, the pivoted member 49 is guided by means of a slot 43 in the sound reducing portion and a pin 42 attached to the housing 13 and received in the slot 43 having yielding friction part in engagement with the pin.

In the end positions or rest positions of the operating means 41 the friction against the guide or extension 42 is large, but in the other positions it is yielding with low friction. This mechanism does not have any movable part and is not bulky and is very cheep, since it is integrated with existing parts of the device.

Figure 8:
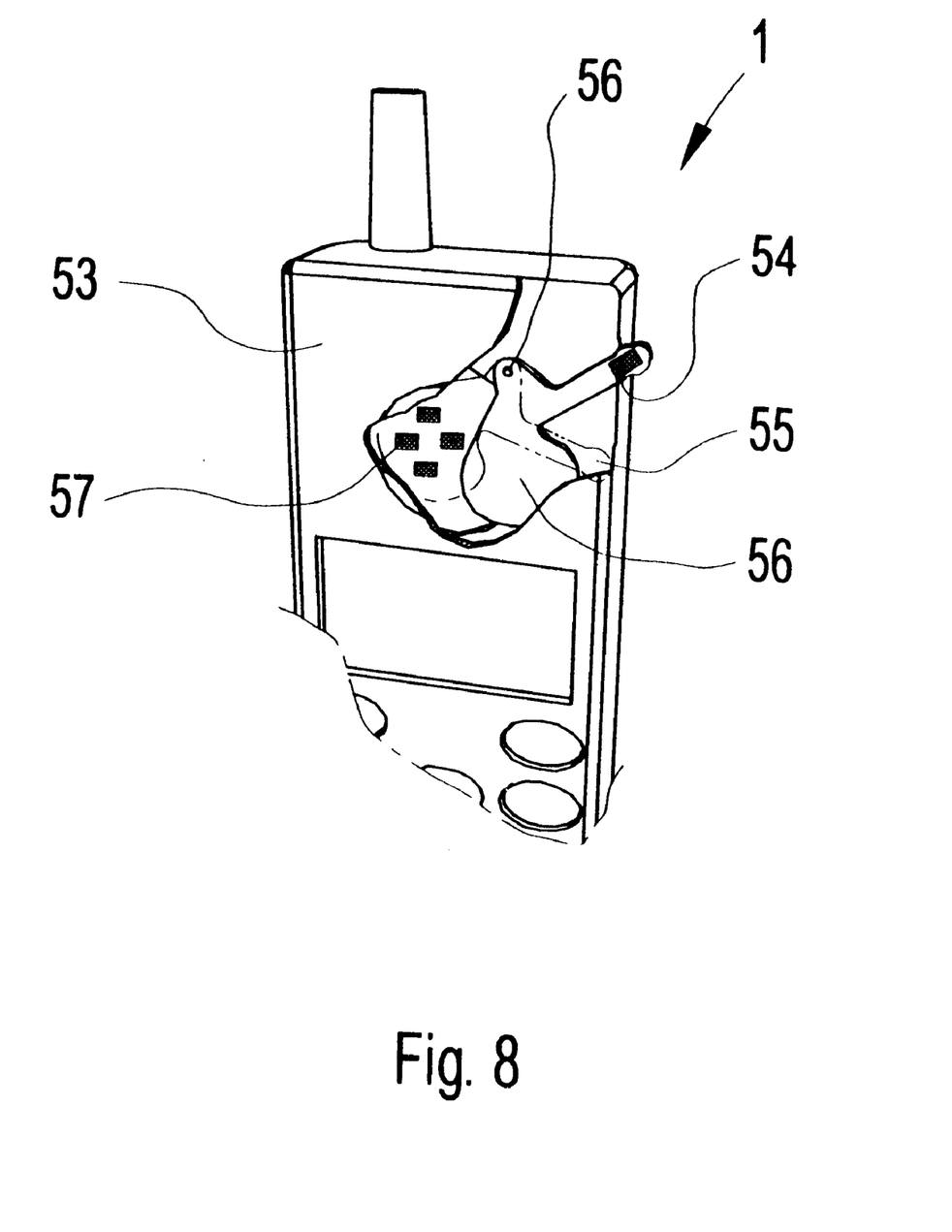
FIG. 8 is an illustrative view of a part of an electronic apparatus having a seventh embodiment of a sound directing element according to the present invention.

FIG. 8 is an illustrative view of a part of an electronic apparatus having a seventh embodiment of a sound directing element according to the present invention, comprising a pivoted member 56 mounted on the housing 53 of the electronic apparatus by an axis 56. A control portion of the pivoted member 56 is provided with a visable colour area 54. Additional coloured areas 57 are provided on the load speaker. The coloured areas 54 and 57 are not visable in the first position 54 and is visable in the second position when the load speaker is at least partly uncovered. The coloured areas 54 and 57 can be located on a plurality of positions as shown in FIG. 8. Thus, in one embodiment of the invention the operating means is provided on the side of the housing of the electronic apparatus 1. Consequently, when the pivoted member 56 is operated by a user between the two rest positions the visable coloured areas 54 and 57 are covered and consequently not visable in the first position and in the second position the coloured areas will be visable through the apertures for the load speaker as well as on the control portion of the pivoted member 49.

In the embodiments described above according to FIGS. 1–8 the sound directing device is either arranged on the outside or inside of the electronic apparatus.

In alternative embodiments of the embodiments described with reference to FIG. 1 the sound directing housing may be slidable, turnable, or foldable back and forth or side to side. The main object is to obtain movements of the sound directing element 3 in order to cover the load speaker 6 at least partly in order to attenuate or tone the sound to a suitable level and redirect it to another direction away from the ear of the user.

The sound channels 7, 20 can be arranged either in the electronic apparatus 1 itself close to the load speaker or in the housing of the sound directing device.

A "doggel switch", a device allowing definition of rest positions of the sound directing element, can be provided in each embodiment. The doggel switch comprises spring loaded balls, which slide to a fixed position wherein the spring loaded element pushes the balls to a recess and thereby the switch into a predetermined position. Other similar arrangements may be used.

The sound directing element described with reference to the different embodiments above may of course be arranged and attached to an electronic apparatus in different ways within the scope of the invention. Additional combinations of the different embodiments are also possible in other embodiments of the invention. For example a slidable housing may be combined with a pivoted member.

The sound directing element according to the invention can be operated or controlled by the user by means of different slewing brackets and/or gears and/or torque converters in order to put the sound directing device in a right position and provide a suitable operating power of the control means.

In another embodiment of the invention the sound directing device is provided with an indication of fracture, which is weaker than the whole arrangement, wherein it is impossible to set the electronic apparatus in a PMR mode with the high sound level if the sound directing element is damaged or broken. Hence, the risk for further impaired hearing of the user is prevented.

In still another embodiment of the invention the electronic apparatus is provided with a combined "push to talk" function and "mute" function press button. The push to talk button also controls the mute function, i.e the microphone is turned off at the same time as the user is listening to an incoming sound from the load speaker. If the button is pressed the microphone is turned on and the load speaker is turned off.

Although the invention has been described by way of a specific embodiments thereof it should be apparent that the present invention provides a sound directing member that fully satisfies the aims and advantages set forth above, and alternatives, modifications and variations are apparent to those skilled in the art.

What is claimed is:

1. An electronic apparatus comprising:
   a housing and a loud speaker mounted in the housing,
   a sound directing element supported by the housing for movement between: (a) a first position in which the sound directing element covers at least part of the loud speaker, and (b) a second position in which said at least part of the loud speaker is not covered by the sound directing element; and
   wherein sound is directed toward an ear of a user when the sound directing element is in the second position, and in another direction away from the ear of the user when the sound directing element is in the first position.

2. An electronic apparatus according to claim 1, wherein at least one sound channel is provided for transmitting, in said first position of said sound directing element, said sound in said another direction.

3. An electronic apparatus according to claim 2, characterized in that the sound directing element comprises a slidable member that is slidably mounted on the housing and having at least one aperture defined therein that is in communication with the sound channel when the sound directing element is in said first position.

4. An electronic apparatus according to claim 2, characterized in that the sound channel is at least partly located in the housing.

5. The apparatus of claim 1, wherein the apparatus is a cell phone. RENUMBER 6. An electronic apparatus of claim 1, characterized in that the sound directing element comprises a pivoted member.

7. An electronic apparatus of claim 6, characterized in that the pivoted member is mounted on the outside of the apparatus.

8. An electronic apparatus of claim 6, characterized in that the pivoted member has a sound reducing portion located within the housing and a control portion located on the outside of the housing.

9. An electronic apparatus of claim 6, characterized in that the pivoted member in at least one end thereof is guided in the housing.

10. An electronic apparatus of claim 6, characterized in that the pivoted member is mounted eccentrically.

11. An electronic apparatus of claim 6, characterized in that the pivoted member is guided by means of a slot in a sound reducing portion and a pin attached to the housing and received in the slot.

12. An electronic apparatus of claim 1, characterized in that the sound directing element comprises a slidable member.

13. An electronic apparatus of claim 12, characterized in that the slidable member is guided in slots in the housing.

14. An electronic apparatus of claim 1, characterized in that the sound directing element comprises a rotary housing.

15. An electronic apparatus of claim 14, characterized in that the rotary housing has at least an aperture in connection with the sound channel in said first position.

16. An electronic apparatus of claim 1, characterized in that said sound directing element has apertures overlapping said loud speaker in said second position.

17. An electronic apparatus of claim 1, characterized in that a portion of the sound directing element has a coloured warning area visible in said second position and invisible in said first position.

18. An electronic apparatus of claim 1, characterized in that the loud speaker has a coloured warning area visible in said second position and invisible in said first position.

19. An electronic apparatus of claim 1, further including a switch for adjusting sound from the loud speaker between a high and low level.

20. An electronic apparatus of claim 19, wherein the switch is operatively connected to the sound directing element, the position of the switch being changed by movement of the sound directing element.

21. An electronic apparatus of claim 1, wherein the sound directing element is provided with a magnet, coil, or metal piece, and the electronic apparatus is provided with a corresponding magnet, coil, or metal piece, together creating an impedance difference while moved in relation to each other, which indicates a position of the sound directing element, and a setting of the electronic apparatus being activated.

* * * * *

UNITED STATES PATENT AND TRADEMARK OFFICE
CERTIFICATE OF CORRECTION

PATENT NO. : 6,631,191 B1  
DATED : October 7, 2003  
INVENTOR(S) : Holmberg

Page 1 of 1

It is certified that error appears in the above-identified patent and that said Letters Patent is hereby corrected as shown below:

Column 6,
Line 33, please delete "RENUMBER".

Signed and Sealed this

Sixteenth Day of March, 2004

JON W. DUDAS
*Acting Director of the United States Patent and Trademark Office*